（12）United States Patent
Sugiyama et al.

(10) Patent No.: US 12,543,256 B2
(45) Date of Patent: Feb. 3, 2026

(54) LIGHTING CONTROL APPARATUS, LIGHTING CONTROL METHOD, LIGHTING APPARATUS

(71) Applicant: Stanley Electric Co., Ltd., Tokyo (JP)

(72) Inventors: Tomoki Sugiyama, Tokyo (JP); Masahiko Sato, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 110 days.

(21) Appl. No.: 18/569,610

(22) PCT Filed: Jun. 2, 2022

(86) PCT No.: PCT/JP2022/022425
§ 371 (c)(1),
(2) Date: Dec. 13, 2023

(87) PCT Pub. No.: WO2022/264819
PCT Pub. Date: Dec. 22, 2022

(65) Prior Publication Data
US 2024/0276621 A1   Aug. 15, 2024

(30) Foreign Application Priority Data
Jun. 15, 2021  (JP) ................. 2021-099720

(51) Int. Cl.
*H05B 47/16*   (2020.01)
*H05B 45/37*   (2020.01)

(52) U.S. Cl.
CPC .......... *H05B 47/16* (2020.01); *H05B 45/37* (2020.01)

(58) Field of Classification Search
CPC ........ H05B 47/16; H05B 45/46; H05B 45/34; H05B 45/37; Y02B 20/40
See application file for complete search history.

(56) References Cited

U.S. PATENT DOCUMENTS 9,999,104 B2   6/2018  Naruo et al.
10,111,284 B2  10/2018  Zhang et al.
(Continued)

FOREIGN PATENT DOCUMENTS

EP   2194761 A1 *  6/2010  ............ H05B 31/50
JP   H02-225148 A   9/1990
(Continued)

OTHER PUBLICATIONS

International Search Report and Written Opinion mailed on Jul. 19, 2022, received for PCT Application PCT/JP2022/022425, filed on Jun. 2, 2022, 09 pages including English Translation.
(Continued)

*Primary Examiner* — Seokjin Kim
(74) *Attorney, Agent, or Firm* — XSENSUS LLP

(57) ABSTRACT

To make conduction time (lighting time) of a light emitting element more uniform.

A lighting control method in which a controller is used to drive a plurality of light source units connected in parallel to each other in a time-division manner, (a) where the controller includes: (b) to perform control of one switch element among a plurality of switch elements connected in series to each of the plurality of light source units to switch to a close state; (c) to start measuring a specified time when a current flowing through a current path between a power supply circuit and the plurality of light source units is equal to or greater than a threshold value; and (d) to perform control of the one switch element to switch to an open state when the specified time has elapsed.

12 Claims, 5 Drawing Sheets

(56) References Cited

U.S. PATENT DOCUMENTS

| | | | |
|---|---|---|---|
| 10,201,046 B2 | 2/2019 | Hasegawa et al. | |
| 2016/0323972 A1* | 11/2016 | Bora | H05B 45/22 |
| 2017/0339756 A1* | 11/2017 | Ahn | H05B 47/28 |
| 2020/0383188 A1* | 12/2020 | Aoki | H05B 45/345 |

FOREIGN PATENT DOCUMENTS

| | | | | |
|---|---|---|---|---|
| JP | 2020-198217 A | | 12/2020 | |
| JP | 2021002440 A | * | 1/2021 | |

OTHER PUBLICATIONS

Extended European search report issued on May 21, 2025, in corresponding European patent Application No. 22824812.6, 12 pages.

* cited by examiner

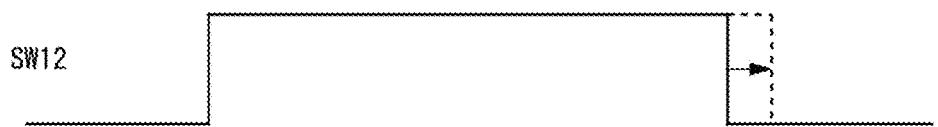
FIG. 5A  SW12
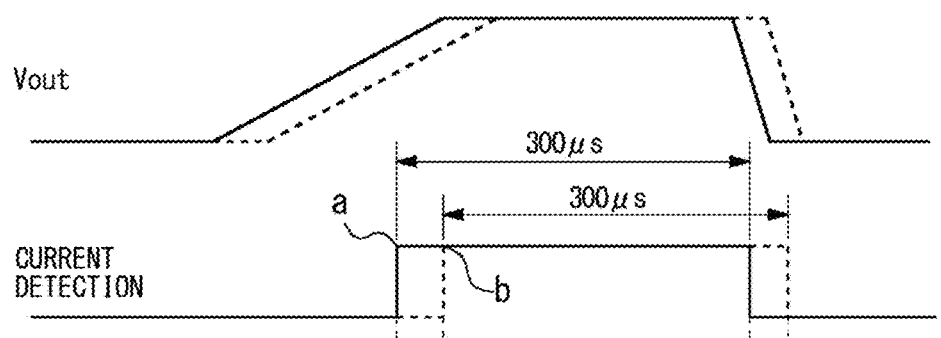
FIG. 5B  Vout
FIG. 5C  CURRENT DETECTION
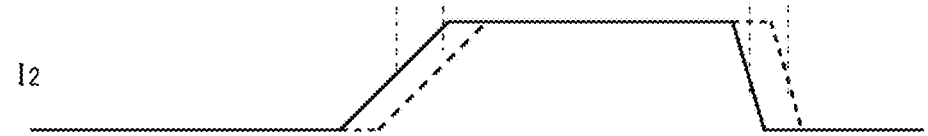
FIG. 5D  I2
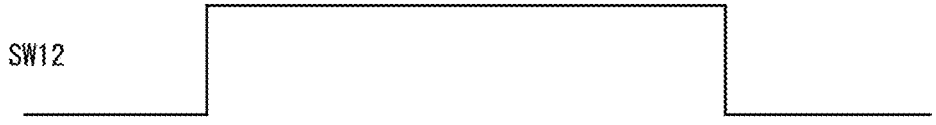
FIG. 6A  SW12
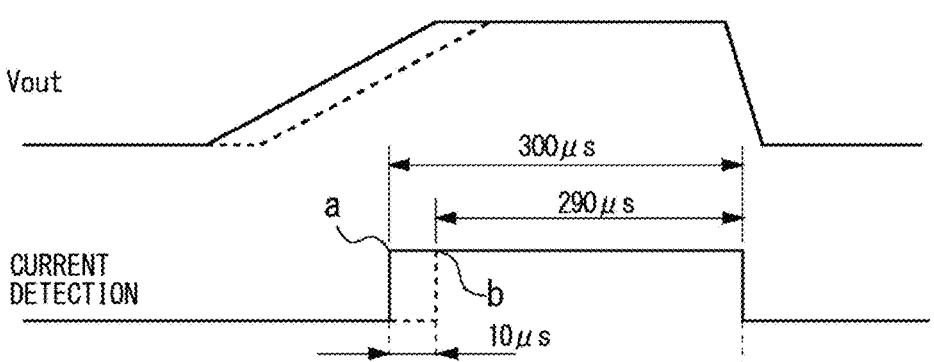
FIG. 6B  Vout
FIG. 6C  CURRENT DETECTION
FIG. 6D  I2

LIGHTING CONTROL APPARATUS, LIGHTING CONTROL METHOD, LIGHTING APPARATUS

CROSS-REFERENCE TO RELATED APPLICATIONS

The present application is based on PCT filing PCT/JP2022/022425, filed Jun. 2, 2022, which claims priority from Japanese Patent Application No. 2021-099720, filed Jun. 15, 2021, the entire contents of each are incorporated herein by reference.

TECHNICAL FIELD

The present disclosure relates to a lighting control apparatus, a lighting control method, and a lighting apparatus.

BACKGROUND ART

Japanese Patent Application Laid-Open No. 2014-103039 (Patent Document 1) discloses a lighting apparatus configured such that series circuits including LEDs and switches are connected in parallel and power is supplied to them from a DC-DC converter. In this lighting apparatus, each LED can be turned on and off individually by opening and closing each switch independently.

PRIOR ART DOCUMENT

Patent Document

[Patent Document 1] Japanese Patent Application Laid-Open No. 2014-103039

SUMMARY OF THE INVENTION

Technical Problem

In a specific aspect, it is an object of the present disclosure to make conduction time of a light emitting element more uniform.

Solution to the Problem (1) A lighting control apparatus according to one aspect of the present disclosure is an apparatus that drives a plurality of light source units connected in parallel to each other in a time-division manner, the apparatus including: (a) a power supply circuit connected to the plurality of light source units and supplies a drive voltage to each of the plurality of light source units; (b) a plurality of switch elements connected in series to each of the plurality of light source units; (c) a current detection section that outputs a signal that reaches a first state when a current flowing through a current path between the power supply circuit and the plurality of light source units is equal to or greater than a threshold value, and outputs a signal that reaches a second state when the current is less than the threshold value, and (d) a controller configured to perform control of the operation of the plurality of switch elements and the power supply circuit based on the signal output from the current detection section; (e) where the controller is further configured to perform control of one switch element among the plurality of switch elements to switch to a close state, then starts measuring a specified time when the signal of the current detection section reaches the first state, and then performs control of the one switch element to switch to an open state when the specified time has elapsed.

(2) A lighting control method according to one aspect of the present disclosure is a lighting control method in which a controller is used to drive a plurality of light source units connected in parallel to each other in a time-division manner, (a) where the controller includes: (b) to perform control of one switch element among a plurality of switch elements connected in series to each of the plurality of light source units to switch to a close state; (c) to start measuring a specified time when a current flowing through a current path between a power supply circuit and the plurality of light source units is equal to or greater than a threshold value; and (d) to perform control of the one switch element to switch to an open state when the specified time has elapsed.

(3) A lighting apparatus including the lighting control apparatus according to the above-described (1) and a plurality of light source units connected to the lighting control apparatus.

According to the above configurations, it is possible to make conduction time (lighting time) of a light emitting element more uniform.

BRIEF DESCRIPTION OF THE DRAWINGS

FIGS. 5A to 5D are waveform diagrams for explaining the operation of a lighting control apparatus.

FIGS. 6A to 6D are waveform diagrams for explaining the operation of a lighting control apparatus of a comparative example.

MODE FOR CARRYING OUT THE INVENTION

Figure 1:
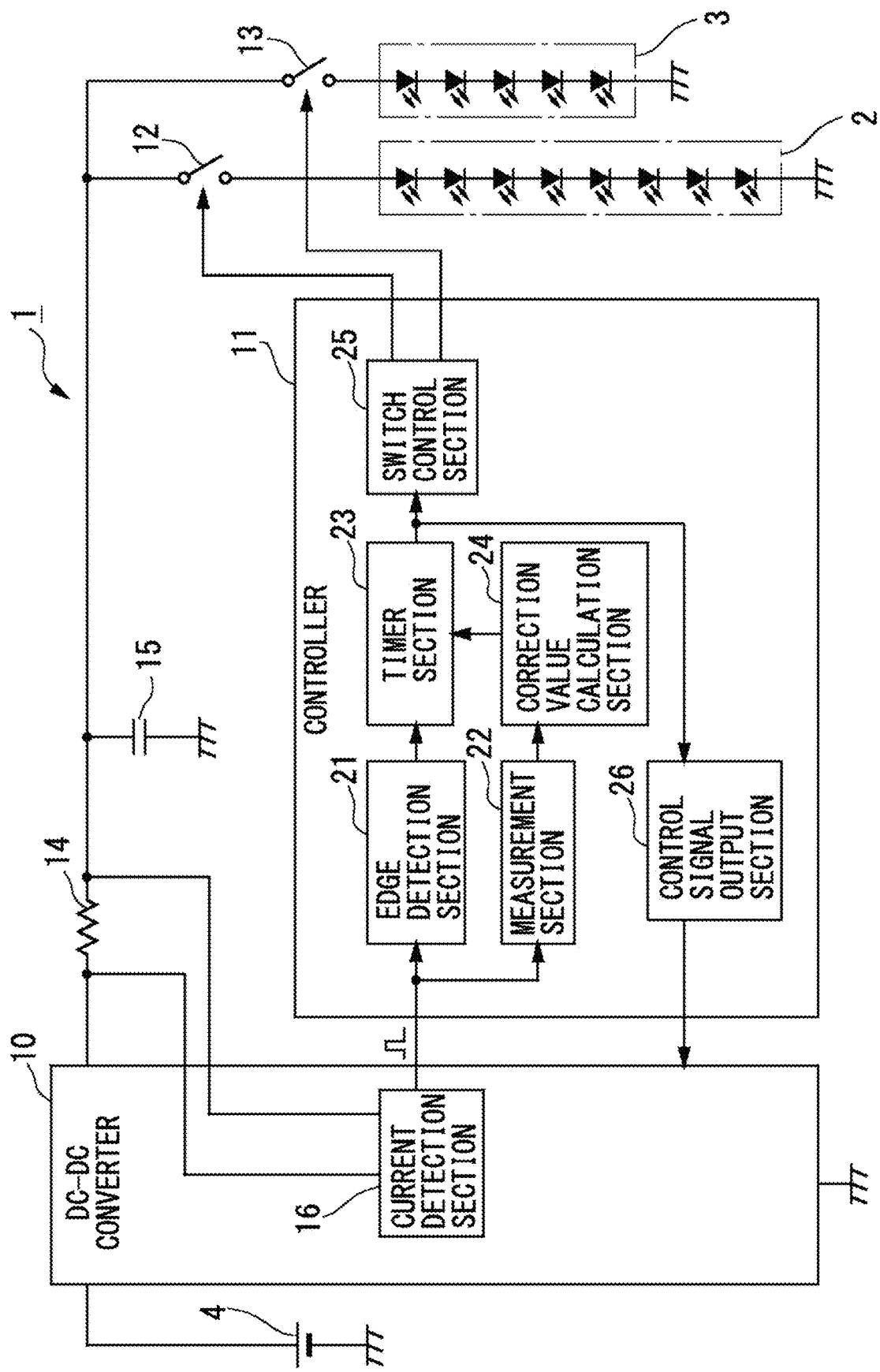
FIG. 1 is a diagram showing a configuration of a lighting control apparatus according to one embodiment.

FIG. 1 is a diagram showing a configuration of a lighting control apparatus according to one embodiment. The illustrated lighting control apparatus 1 receives power from a battery 4 installed in a vehicle and performs control of turning on and off of lamp units 2 and 3 that are each configured to include a plurality of light emitting elements (LEDs). The lighting control apparatus 1 is configured to include a DC-DC converter 10, a controller 11, switch elements 12 and 13, a resistance element 14, and a capacitance element 15. Here, note that a vehicle lamp (lighting apparatus) is configured to include the lighting control apparatus 1 and the lamp units (light source units) 2, and 3.

The lamp unit 2 is configured by connecting in series a plurality of light emitting elements (eight in the illustrated example), and one end is connected to the switch element 12, and the other end is connected to a GND terminal (reference potential terminal). The lamp unit 3 is configured by connecting in series a smaller number of light emitting elements (five in the illustrated example) than the lamp unit 2, and one end is connected to the switch element 13, and the other end is connected to the GND terminal (reference potential terminal). These lamp units 2 and 3 are used such that, for example, the lamp unit 2 is used as a position lamp to indicate the width of a vehicle, and the lamp unit 3 is used as a headlamp that emits a low beam to the front of the vehicle.

The DC-DC converter 10 receives power from the battery 4, generates and outputs a voltage to supply current to each lamp unit 2, 3. Based on end-to-end voltage of the resistance element 14 connected on the current path between each lamp unit 2, 3 and the DC-DC converter 10, the DC-DC converter 10 of the present embodiment includes a current detection section 16 that detects current (hereinafter referred to as "LED current") flowing through each lamp unit 2, 3. The current detection section 16 outputs a signal that reaches a high level (a first state) when the LED current becomes equal to or greater than a predetermined threshold value (for example, 50% of a specified value), and outputs a a signal that reaches a low level (a second state) when the LED current becomes less than the predetermined threshold value. Here, note that the current detection section 16 may be configured separately from the DC-DC converter 10.

The switch element 12 has one end connected to the DC-DC converter 10 via the resistance element 14, and the other end connected to the lamp unit 2. Similarly, the switch element 13 has one end connected to the DC-DC converter 10 via the resistance element 14, and the other end connected to the lamp unit 3. These switch elements 12 and 13 are switched between "on" and "off" states ("close" and "open" states) in response to control signals provided from the controller 11. For each of the switch elements 12 and 13, for example, a field effect transistor or a bipolar transistor can be used.

The resistance element 14 has one end connected to the DC-DC converter 10 and the other end connected to each of the switch elements 12 and 13. The capacitance element 15 has one end connected between the resistance element 14 and each switch element 12, 13, and the other end connected to the GND terminal. The capacitance element 15 has roles such as stabilizing the output voltage of the DC-DC converter 10 and absorbing noise.

The controller 11 is connected to each of the switch elements 12 and 13 as well as to the DC-DC converter 10, and performs control of the overall operation of the lighting control apparatus 1. This controller 11 is realized by, for example, using a microcomputer that is configured to include a CPU, ROM, RAM, etc. (refer to FIG. 2 described later), and executing a predetermined program in the CPU. For ease of understanding the functions realized by the controller 11, functional blocks will be used in the following description. As functional blocks, the controller 11 includes an edge detection section 21, a measurement section 22, a timer section 23, a correction value calculation section 24, a switch control section 25, and a control signal output section 26.

The edge detection section 21 detects a high level edge of the signal output from the current detection section 16 of the DC-DC converter 10, that is, a rising edge at which the signal changes from a low level to a high level.

The measurement section 22 measures the time from when the signal output from the current detection section 16 of the DC-DC converter 10 reaches a high level until the time the signal reaches a low level, that is, the time during which the signal has maintained the high level.

The timer section 23 starts a timer operation (timing operation) in response to the detection of the rising edge by the edge detection section 21, and measures a specified time which has been preset.

The correction value calculation section 24 calculates a correction value for correcting the specified time to be measured when the timer operates in the timer section 23 based on the time measured by the measurement section 22.

The switch control section 25 outputs a control signal to each switch element 12, 13 to perform control of the on and off operation of each switch element 12, 13. The switch control section 25 of the present embodiment outputs a control signal to switch each switch element 12, 13 from an "on" state (a "close" state) to an "off" state (an "open" state) in response to completion of the timer operation by the timer section 23 and elapse of the specified time.

The control signal output section 26 outputs a control signal to switch start and stop of the voltage output operation by the DC-DC converter 10. In the present embodiment, the control signal output section 26 outputs a control signal for bringing the DC-DC converter 10 into a stop state (a state in which no voltage is output) in response to the elapse of the specified time due to the timer operation by the timer section 23.

Figure 2:
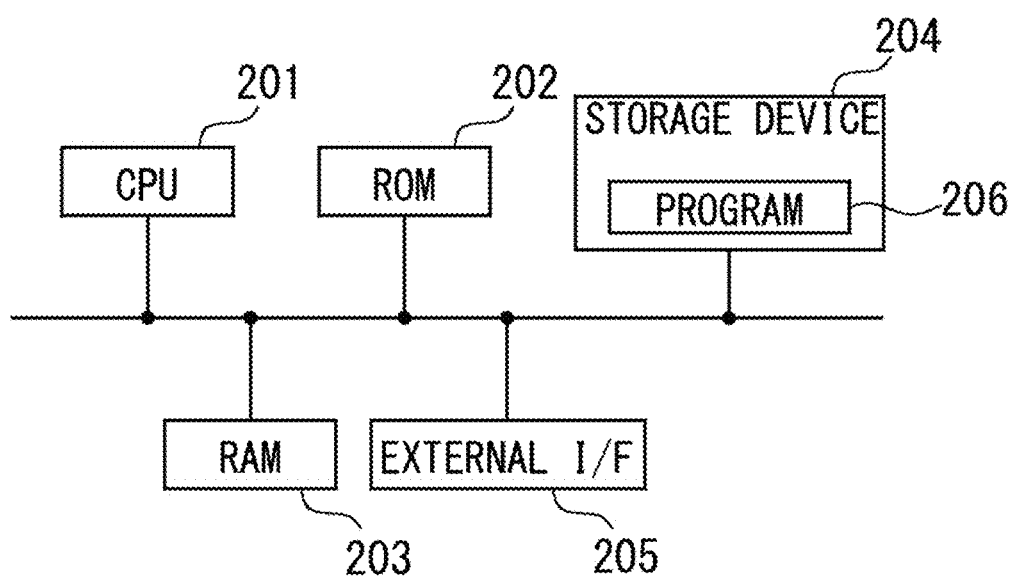
FIG. 2 is a diagram showing an example of the configuration of a microcomputer that realizes a controller.

FIG. 2 is a diagram showing an example of the configuration of a microcomputer that realizes the controller. The illustrated microcomputer is configured to include a CPU (Central Processing Unit) 201, a ROM (Read Only Memory) 202, a RAM (Random Access Memory) 203, a storage device 204, and an external interface (I/F) 205 that are connected to each other so as to be able to communicate with each other. The CPU 201 operates based on a basic control program read from the ROM 202, and realizes each function of the controller 11 described above by reading and executing a program (an application program) 206 stored in the storage device 204. The RAM 203 temporarily stores data used when the CPU 201 operates. The storage device 204 is a nonvolatile storage device such as a hard disk or a solid state drive, and stores various data such as the program 206. The external interface 205 is an interface that connects the CPU 201 and an external device.

FIGS. 3A to 3F are waveform diagrams for explaining the basic operation of the lighting control apparatus 1. In the present embodiment, power is supplied to each of the lamp units 2 and 3 in a time-division manner during one cycle T of control performed by the lighting control apparatus 1, and each lamp unit 2, 3 lights up in a time-division manner. At this time, by shortening the length of the cycle T than the limit of human visual recognition and by performing control of on and off of the lighting repeatedly, in appearance, both lamp units 2 and 3 are perceived to be continuously lit.

Figure 3:
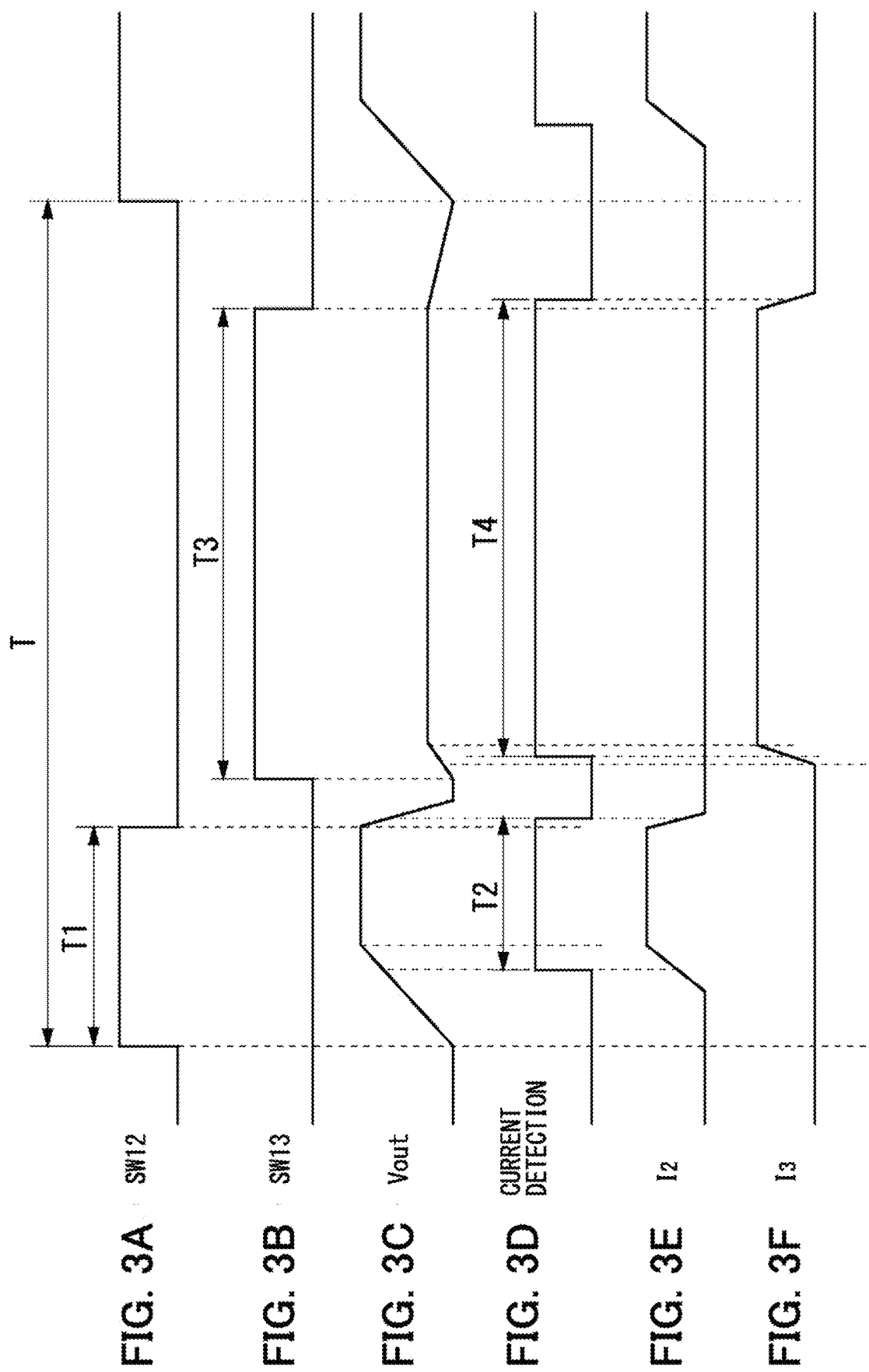
FIGS. 3A to 3F are waveform diagrams for explaining the basic operation of a lighting control apparatus.

Specifically, as shown in FIG. 3A, at the beginning of period T1 within period T, the switch element 12 (denoted as "SW12" in the figure) is controlled to switch to an "on" state. Then, at the end of period T1, the switch element 12 is controlled to switch to an "off" state.

During this period T1, as shown in FIG. 3C, a drive voltage $V_{out}$ from the DC-DC converter 10 rises from 0 volt to a predetermined value in conjunction with the switching of the switch element 12 to the "on" state, and after reaching a constant value, the drive voltage Vout drops to 0 volts in conjunction with the switching of the switch element 12 to the "off" state.

Further, as shown in FIG. 3E, the LED current $I_2$ flowing through the lamp unit 2 starts to increase from the time when the driving voltage $V_{out}$ exceeds the total value of a forward voltage VF of each light emitting element of the lamp unit 2, becomes constant after reaching a predetermined value, then decreases as the drive voltage $V_{out}$ decreases, and reaches 0 ampere at the time when the voltage drops to the total value of a forward voltage VF or less.

Here, as shown in FIG. 3D, the signal output from the current detection section 16 changes to a high level when the LED current $I_2$ reaches 50% or more based on the rated value (the constant value after the increase shown in the figure), and changes to a low level when the current falls below 50%, in the illustrated example. In the present embodiment, the "on" and "off" state of the switch element 12 is controlled so that period T2 during which the signal output from the current detection section 16 maintains a high level is a predetermined specified time (target time: 300 μs, as an example). Details of this control will be described later.

The lighting control of the lamp unit 3 is also similar to that of the lamp unit 2 described above. Specifically, as shown in FIG. 3B, at the beginning of period T3 which starts from the starting point after a certain period of time from the ending point of period T1, the switch element 13 (denoted as "SW13" in the figure) is controlled to be in the "on" state. Then, at the end of period T3, the switch element 13 is controlled to be in the "off" state.

During this period T3, as shown in FIG. 3C, in conjunction with the switching of the switch element 13 to the "on" state, the drive voltage $V_{out}$ from the DC-DC converter 10 rises from 0 volt to a predetermined value, and then remains at a constant value. Then, in conjunction with the switching of the switch element 13 to the "off" state, the drive voltage Vout drops to 0 volt.

Further, as shown in FIG. 3F, the LED current $I_3$ flowing through the lamp unit 3 starts increasing from the time when the driving voltage $V_{out}$ exceeds the total value of a forward voltage VF of each light emitting element of the lamp unit 3, becomes constant after reaching a predetermined value, then decreases as the drive voltage $V_{out}$ decreases, and reaches 0 ampere when the driving voltage $V_{out}$ drops to the total value of the forward voltage VF or less.

Here, as shown in FIG. 3D, the signal output from the current detection section 16 changes to a high level when the LED current $I_3$ reaches 50% or more based on the rated value (the constant value after the increase shown in the figure), and changes to a low level when the current falls below 50%, in the illustrated example. In the present embodiment, the "on" and "off" state of the switch element 13 is controlled so that period T4 during which the signal output from the current detection section 16 maintains a high level is a predetermined specified time (target time: 3000 μs, as an example). Details of this control will be described later.

Figure 4:
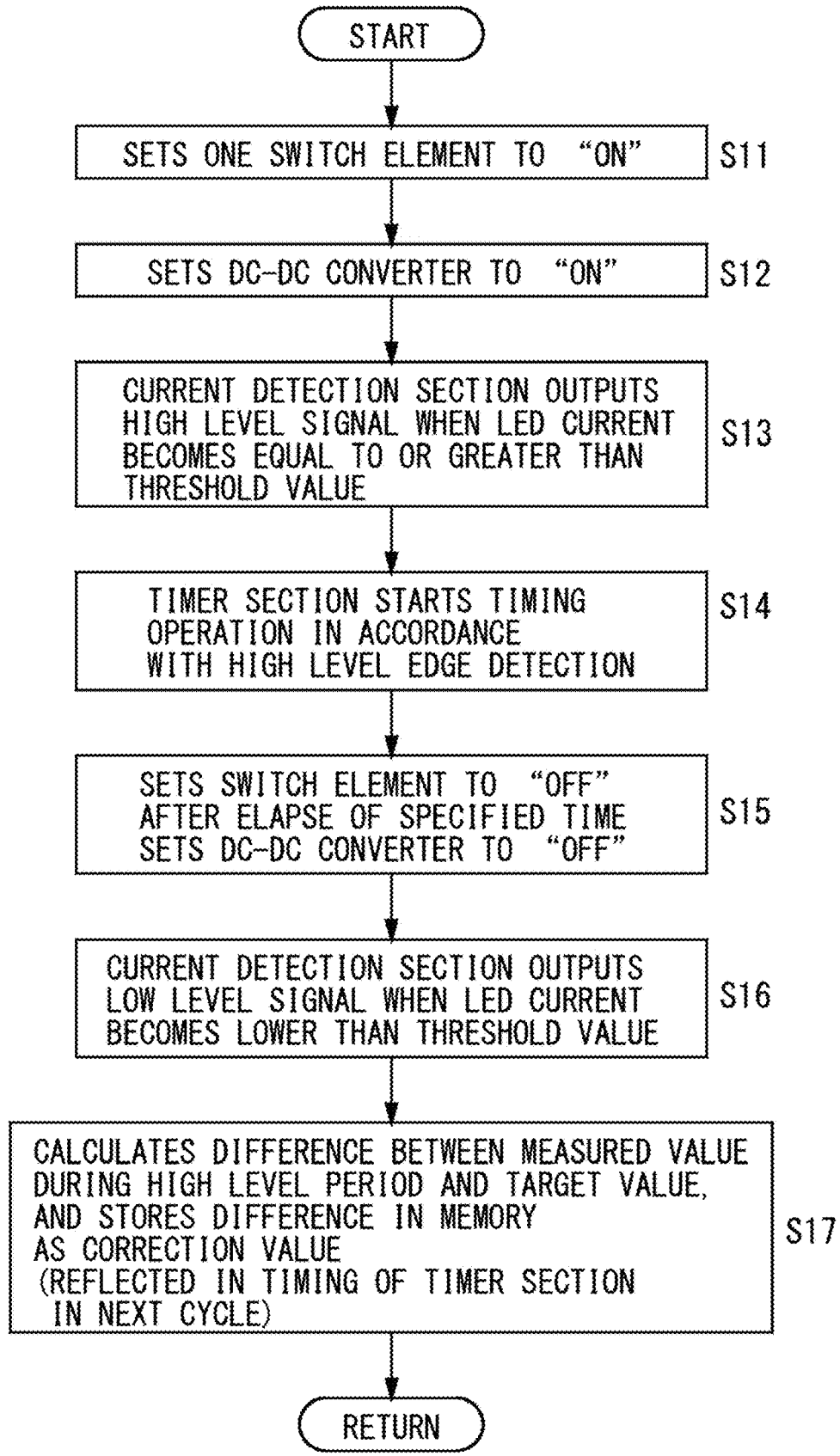
FIG. 4 is a flowchart showing an operating procedure of a controller.

The configuration and basic operation of the lighting control apparatus 1 of the present embodiment are as described above. Next, the operation procedure of the controller 11 will be described with reference to the flowchart of FIG. 4 and the waveform diagram of FIG. 5. Here, note that the order of operations may be changed as appropriate as long as no contradiction or inconsistency occurs in the control results, and other operations not described here may be added, and such implementations are not excluded.

The switch control section 25 of the controller 11 sets one switch element (the switch element 12 in this description) to an "on" state (step S11). Further, the control signal output section 26 of the controller 11 sets the DC-DC converter 10 to an "on" state (a state in which a voltage is output) (step S12).

As a result, as shown in FIG. 5A, the switch element 12 becomes the "on" state, and the lamp unit 2 and the DC-DC converter 10 are electrically connected. Then, as shown by the solid line in FIG. 5B, the drive voltage $V_{out}$ output from the DC-DC converter 10 begins to rise.

When the drive voltage $V_{out}$ rises and the LED current $I_2$ flowing through each light emitting element of the lamp unit 2 becomes equal to or greater than the threshold value (50% of the rated value), the current detection section 16 outputs a high level signal, as shown by a solid line in FIG. 5C (step S13). Accordingly, a high level edge is detected by the edge detection section 21, and in accordance with the detection of this high level edge, the timer section 23 starts a timing operation (step S14).

When the timer section 23 measures the elapse of the specified time (for example, the above-described 300 μs), the switch control section 25 sets the switch element 12 to the "off" state. (step S15).

When the LED current becomes lower than the threshold value, the current detection section 16 outputs a low level signal (step S16).

The measurement section 22 measures the period during which the signal output from the current detection section 16 maintains a high level. The correction value calculation section 24 calculates the difference between the measured value during the high level period measured by the measurement section 22 and the target value, and stores the difference in the memory as a correction value (step S17).

Here, note that the correction value obtained in step S17 is reflected in the timing of the timer section in the next cycle. For example, if the specified time of the high level period is 300 μs and the measured value is 305 μs, then the correction value obtained from the difference between them will be −5 μs. In the next cycle, the timer section 23 reflects this correction value, and sets the specified time to 295 μs, and performs timing operation.

Thereafter, the process returns to step S11, and the same steps S11 to S17 as described above are performed on the series circuit section of the lamp unit 3 and the switch element 13. This completes the control of one cycle T. Thereafter, the process returns to step S11, and the same steps S11 to S17 are performed on the series circuit section of the lamp unit 2 and the switch element 12, and steps S11 to S17 are performed on the series circuit section of the lamp unit 3 and the switch element 13, and each of these processes is performed alternately.

Hereinafter, effects of the present embodiment will be described with reference to FIGS. 5 and 6. In the present embodiment, since two lamp units 2 and 3 having different numbers of light emitting elements are driven in a time-division manner, the drive voltage output from the DC-DC converter 10 varies for each lamp unit. Here, for example, assuming that the DC-DC converter 10 is an H-bridge type DC-DC converter that can operate in three modes, namely step-up mode, step-down mode, and step-up/down mode, then in a area where the input voltage from the battery 4 and the output voltage of the DC-DC converter 10 are approximately equal, topology switching between step-up mode and step-up/down mode occurs frequently in the DC-DC converter 10. In other words, a case in which driving starts with a step-up mode or a case in which driving starts with step-up/down mode randomly occurs every cycle, and the point at which the drive voltage starts to rise varies between the two modes. For example, when driving starts with step-up/down mode, the point at which the drive voltage starts to rise is delayed. For this reason, it is assumed that the point at which the drive voltage of the DC-DC converter 10 starts to rise varies randomly.

As shown by the dotted line in FIG. 5B, if the starting point of the rise of the drive voltage of the DC-DC converter 10 is delayed due to the above-described reason, then, as shown by the dotted line in FIG. 5D, the point at which the LED current $I_2$ starts to rise is also delayed. Here, as shown in FIG. 5C, the timing at which the signal output from the current detection section 16 becomes high level is delayed from the originally expected point "a" and becomes point "b". This high level edge at point "b" is detected by the edge detection section 21, and in response, the switch control section 25 sets the switch element 12 to an "on" state, and the timer section 23 initiates a timing operation. Therefore, even if the starting point of the drive voltage rise of the DC-DC converter 10 is delayed, a specified time (300 µs, as an example) is measured from point "b" that reflects the delay, and during that time, the drive voltage $V_{out}$ continues to be provided to the lamp unit 2. Further, due to the influence of the capacitance element 15, etc., there is a delay after the DC-DC converter 10 is turned off until the LED current falls, but in the present embodiment, since a correction value is calculated based on the period during which the signal of the current detection unit 16 maintains a high level and is reflected in the control of the next cycle, it is possible to correct such a delay of the fall. Therefore, regardless of fluctuations in the starting point of the drive voltage of the DC-DC converter 10, the application time of the drive voltage to the lamp unit 2, in other words, the conduction time of the LED current can be controlled to be constant. Thereby, flickering of the emitted light can be reduced.

On the other hand, as shown in a comparative example of FIG. 6, consider a case where the start of the timing operation by the timer section 23 is linked to the timing when the switch element 12 is switched to the "on" state (refer to FIG. 6A). If there is a delay in the starting point of the rise of the drive voltage of the DC-DC converter 10 (refer to the dotted line in FIG. 6B), then the starting point of the rise in the LED current $I_2$ will also be delayed by that amount, as shown in FIG. 6D. Here, since a control is being performed such that a certain period of time from the time the switching element 12 reaches the "on" state is measured, and then the switching element 12 is set to a "off" state, it is not possible to follow the delay of the starting point of the rise of the drive voltage, and as shown in FIG. 6C, the conduction time of the LED current becomes shorter. In the illustrated example, it is 10 µs shorter. This 10 µs delay can be dealt with by lengthening the "on" state time of the switch element 12 in the next cycle, but since the conduction time of the LED current changes every cycle, the emitted light may flicker (increase or decrease in light). Further, the starting point of the rise of the drive voltage of the DC-DC converter 10 may not necessarily be delayed in the next cycle as well, which may also cause the emitted light to flicker. When the conduction time within one cycle time is short, relatively, an increase or a decrease of the conduction time has a significant influence.

Here, note that in the above effect description, the operation of the series circuit section of the lamp unit 2 and the switch element 12 is exemplified, but the same effect can be obtained with the series circuit section of the lamp unit 3 and the switch element 13.

According to the embodiment described above, it is possible to make the conduction time (lighting time) of each light emitting element included in each lamp unit 2, 3 more uniform, without being affected by fluctuations of the starting point of the drive voltage rise due to topology switching, etc. of the DC-DC converter 10.

Note that the present disclosure is not limited to the contents of the embodiments described above, and can be implemented with various modifications within the scope of the gist of the present disclosure. For example, in the above-described embodiment, two lamp units are driven by one DC-DC converter in a time-division manner, however, the content of the present disclosure may be applied when three or more lamp units are being time-shared. Further, although a DC-DC converter has been cited as an example of a power supply circuit, the power supply circuit is not limited thereto.

Further, the number of light emitting elements included in each lamp unit is merely an example, and is not limited thereto. Further, the connection form of the light emitting elements in each lamp unit is not limited to the series connection of the above-described embodiment, but may be a parallel connection, or a combination of a series connection and a parallel connection. Further, the numerical values such as the specified time disclosed in the embodiment description are merely examples, and the present disclosure is not limited thereto.

Further, in the embodiment described above, a headlamp or a position lamp of a vehicle is exemplified as a lamp unit, but the scope of application of the present disclosure is not limited thereto. For example, the present disclosure may be applied to a rear lamp of a vehicle or a high beam lamp. Furthermore, the scope of application is not limited to vehicle applications.

REFERENCE SIGNS LIST

1: Lighting control apparatus
2, 3: Lamp unit
4: Battery
10: DC-DC converter
11: Controller
12, 13: Switch element
14: Resistance element
15: Capacitance element
16: Current detection section
21: Edge detection section
22: Measurement section
23: Timer section
24: Correction value calculation section
25: Switch control section
26: Control signal output section

The invention claimed is:

1. A lighting control apparatus comprising:
a power supply circuit connected to a plurality of light source assemblies and supplying a driving voltage to each of the plurality of light source assemblies, the plurality of light source assemblies being connected to the lighting control apparatus in parallel and being driven by the lighting control apparatus in a time-division manner;
a plurality of switch elements connected in series to each of the plurality of light source assemblies;
a current detection circuit that outputs a signal that reaches a first state when a current flowing through a current path between the power supply circuit and the plurality of light source assemblies is equal to or greater than a threshold value, and outputs a signal that reaches a second state when the current is less than the threshold value, and
a control circuit configured to perform control of the operation of the plurality of switch elements and the power supply circuit based on the signal output from the current detection circuit;
wherein the control circuit is further configured to perform control of one switch element among the plurality of switch elements to switch to a close state, then start measuring a specified time when the signal of the current detection circuit reaches the first state, and then perform control of the one switch element to switch to an open state when the specified time has elapsed, and wherein the control circuit is configured to measure a time during which the signal from the current detection circuit maintains the first state, calculate a difference between the time and the specified time, and correct the specified time using the difference.

2. The lighting control apparatus according to claim 1, wherein the control circuit is configured to start the operation of the power supply circuit in conjunction with performing control of the one switch element to switch to the close state, and to stop the operation of the power supply circuit in conjunction with performing control of the one switch element to switch to the open state.

3. The lighting control apparatus according to claim 1, wherein the control circuit is configured to perform control of the one switch element to switch to the close state and perform control of the one switch element to switch to the open state in accordance with a lapse of the specified time, said control being performed to each of the plurality of switch elements in a time-division manner.

4. The lighting control apparatus according to claim 1, wherein the power supply circuit is a DC-DC converter.

5. The lighting control apparatus according to claim 1, wherein each of the plurality of light source assemblies is configured to have one or more light emitting elements.

6. A lighting apparatus comprising:
a plurality of light source assemblies; and
a lighting control apparatus which drives the plurality of light source assemblies connected in parallel to each other in a time-division manner, that comprises,
  a power supply circuit connected to the plurality of light source assemblies and supplying a driving voltage to each of the plurality of light source assemblies,
  a plurality of switch elements connected in series to each of the plurality of light source assemblies,
  a current detection circuit that outputs a signal that reaches a first state when a current flowing through a current path between the power supply circuit and the plurality of light source assemblies is equal to or greater than a threshold value, and outputs a signal that reaches a second state when the current is less than the threshold value, and
  a control circuit configured to perform control of the operation of the plurality of switch elements and the power supply circuit based on the signal output from the current detection circuit,
  wherein the control circuit is further configured to perform control of one switch element among the plurality of switch elements to switch to a close state, then start measuring a specified time when the signal of the current detection circuit reaches the first state, and then perform control of the one switch element to switch to an open state when the specified time has elapsed, and
  wherein the control circuit is configured to measure a time during which the signal from the current detection circuit maintains the first state, calculate a difference between the time and the specified time, and correct the specified time using the difference.

7. The lighting control apparatus according to claim 2, wherein the control circuit is configured to perform control of the one switch element to switch to the close state and perform control of the one switch element to switch to the open state in accordance with a lapse of the specified time, said control being performed to each of the plurality of switch elements in a time-division manner.

8. The lighting control apparatus according to claim 2, wherein the power supply circuit is a DC-DC converter.

9. The lighting apparatus according to claim 6, wherein the control circuit is configured to start the operation of the power supply circuit in conjunction with performing control of the one switch element to switch to the close state, and to stop the operation of the power supply circuit in conjunction with performing control of the one switch element to switch to the open state.

10. The lighting apparatus according to claim 6, wherein the control circuit is configured to perform control of the one switch element to switch to the close state and perform control of the one switch element to switch to the open state in accordance with a lapse of the specified time, said control being performed to each of the plurality of switch elements in a time-division manner.

11. The lighting apparatus according to claim 6, wherein the power supply circuit is a DC-DC converter.

12. The lighting apparatus according to claim 6, wherein each of the plurality of light source assemblies is configured to have one or more light emitting elements.

* * * * *